US006799159B2

(12) United States Patent
Feeney et al.

(10) Patent No.: US 6,799,159 B2
(45) Date of Patent: Sep. 28, 2004

(54) METHOD AND APPARATUS EMPLOYING A VOCODER FOR SPEECH PROCESSING

(75) Inventors: Gregory A. Feeney, Palatine, IL (US); Ralph L. D'Souza, Sunrise, FL (US)

(73) Assignee: Motorola, Inc., Schaumburg, IL (US)

(*) Notice: Subject to any disclaimer, the term of this patent is extended or adjusted under 35 U.S.C. 154(b) by 30 days.

(21) Appl. No.: 09/852,479

(22) Filed: May 10, 2001

(65) Prior Publication Data

US 2003/0130838 A1 Jul. 10, 2003

Related U.S. Application Data

(63) Continuation-in-part of application No. 09/017,140, filed on Feb. 2, 1998, now abandoned.

(51) Int. Cl.[7] ................................................ G01L 19/12

(52) U.S. Cl. ....................... 704/221; 704/201; 704/219; 704/223; 455/428; 455/63.1; 455/3.05; 455/242.1

(58) Field of Search ................................ 704/221, 200, 704/219, 201, 223; 455/3.05, 428, 63.1, 242.1

(56) References Cited

U.S. PATENT DOCUMENTS

| | | | | | |
|---|---|---|---|---|---|
| 4,953,185 | A | * | 8/1990 | Goode | 375/354 |
| 4,964,165 | A | * | 10/1990 | Journeau | 380/261 |
| 5,027,352 | A | * | 6/1991 | Goode | 370/345 |
| 5,216,747 | A | | 6/1993 | Hardwick et al. | 395/2 |
| 5,574,823 | A | | 11/1996 | Hassancin et al. | 395/2.17 |
| 5,596,677 | A | | 1/1997 | Jarvinen et al. | 395/2.29 |
| 5,644,679 | A | * | 7/1997 | Scott et al. | 704/224 |
| 5,696,873 | A | | 12/1997 | Bartkowiak | 395/2.25 |
| 5,765,127 | A | | 6/1998 | Nishiguchi et al. | 704/208 |
| 5,774,835 | A | | 6/1998 | Ozawa | 704/205 |
| 5,778,338 | A | * | 7/1998 | Jacobs et al. | 704/223 |
| 5,878,388 | A | | 3/1999 | Nishiguchi et al. | 704/2.4 |
| 5,912,882 | A | * | 6/1999 | Yafuso et al. | 370/270 |

* cited by examiner

*Primary Examiner*—Vijay Chawan
(74) *Attorney, Agent, or Firm*—Miller, Johnson, Snell & Cummiskey PLC

(57) ABSTRACT

A vocoder (125) is initialized, prior to processing an initial batch of audio data, from parameters extracted from the first frame of audio data (308, 310, 320, 330, 332). In the instant embodiment, parameters affecting voice encoding, which are based on estimates of direct current bias, are used to program a high pass filter (253) incorporated in the vocoder (125).

11 Claims, 2 Drawing Sheets

METHOD AND APPARATUS EMPLOYING A VOCODER FOR SPEECH PROCESSING

CROSS REFERENCE TO RELATED APPLICATIONS

This application is a continuation-in-part of U.S. application Ser. No. 09/017,140, filed Feb. 2, 1998, now abandoned and assigned to Motorola, Inc.

TECHNICAL FIELD

This invention relates in general to digital speech communications, and in particular, to speech encoding using vocoders.

BACKGROUND OF THE INVENTION

Two-way radios are commonly used in public safety and dispatch operations. Such radios often employ a push-to-talk switch for simplex communication. In a typical operation, an operator engages the push-to-talk switch and begins speaking into a microphone. Voice signals received via the microphone are processed and modulated onto a carrier signal for communication. The push-to-talk switch may be engaged and disengaged several times during a communication session.

Digital voice communication has become commonplace in radio communication systems. Generally, digitized speech is applied to a voice encoder ("vocoder") prior to transmission over a communication link. Modern vocoders use a variety of speech modeling techniques to encode speech, including linear predictive coding, multiband excitation, and others. A vocoder operates to extract speech modeling parameters, such as pitch, voiced/unvoiced classification, spectral amplitudes, gain, and other vocal tract parameters, from the digitized speech. These extracted parameters are encoded to provide a representation of the original speech data. This encoded speech data is transmitted over the communication link. A recipient of the encoded speech data applies a corresponding speech decoder to recover the original speech, which is rendered by a speech synthesizer.

The ability of the vocoder to extract the model parameters required for accurate speech encoding depends in part on the quality of the original speech signal. It is not uncommon for vocoders to include circuitry to remove unwanted signal components, such as signal components resulting from direct current (DC) bias. For example, the improved multiband excitation (IMBE) vocoder used as a standard in the Associated Public-Safety Communications Officers (APCO) 25 standard includes a high pass filter to remove direct current bias from digitized speech signals. This filter includes a feedback network and performs best after a particular elapsed time required for settling and/or stabilization. Thus, the filter requires a particular elapsed time for proper operation.

In many implementations, it is necessary to disable communication circuitry when not in use to reduce current drain. For example, in a simplex push-to-talk two-way radio, there is generally no need to enable the vocoder when the push-to-talk switch is not engaged, as there is no voice input. When the push-to-talk switch is engaged and the vocoder enabled, there may be a small elapsed time before the vocoder circuitry reaches steady state. During such time, the vocoder may be unable to correctly extract model parameters required for speech encoding.

It is desirable to have a vocoder that operates correctly immediately after being enabled such that speech initially processed is properly encoded. Therefore, a new method and apparatus for employing a vocoder in speech processing is needed.

DETAILED DESCRIPTION OF THE PREFERRED EMBODIMENT

Figure 1:
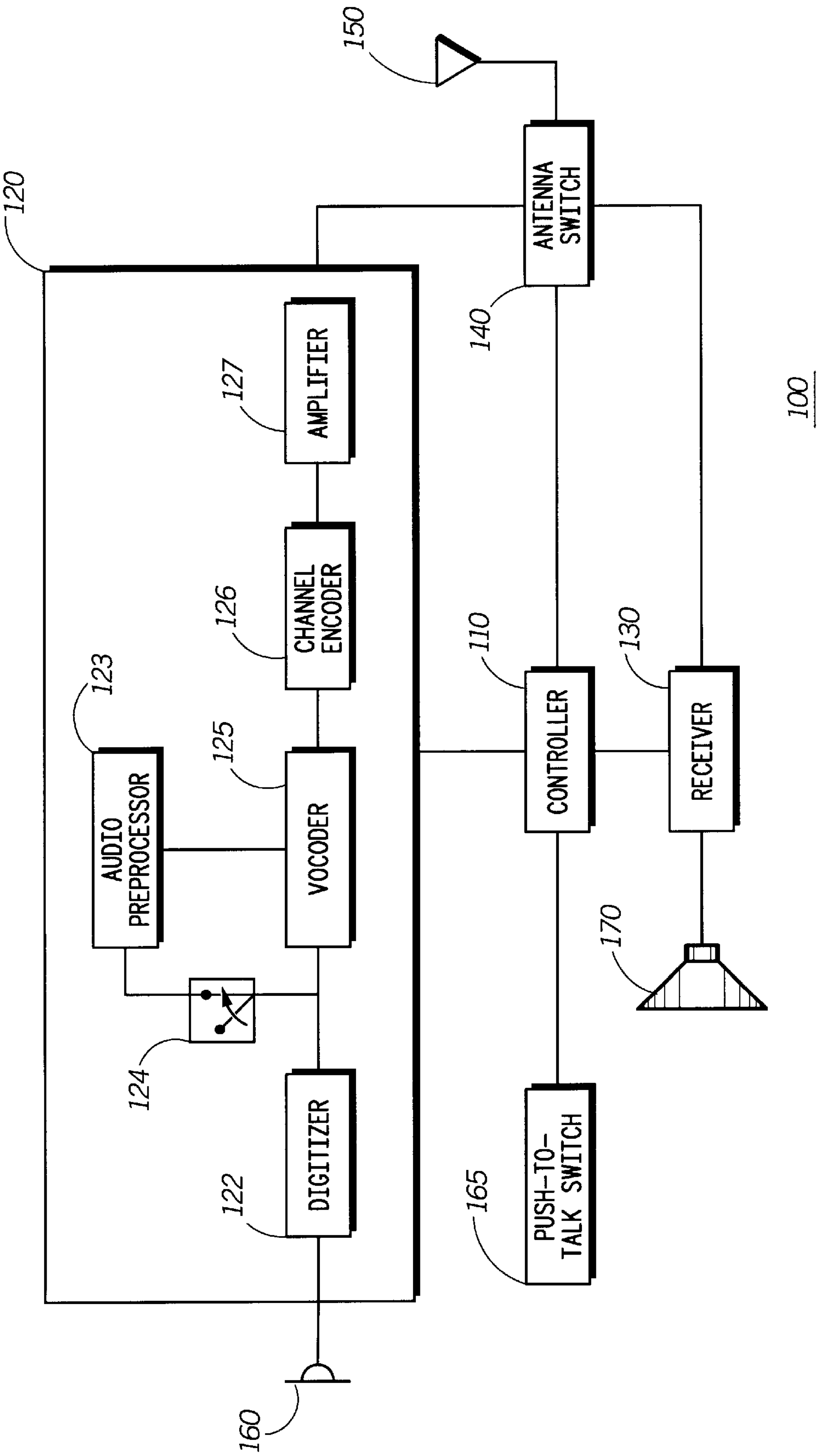
FIG. 1 is a block diagram of a radio communication device employing a vocoder, in accordance with the present invention.

While the specification concludes with claims defining the features of the invention that are regarded as novel, it is believed that the invention will be better understood from a consideration of the following description in conjunction with the drawing figures, in which like reference numerals are carried forward.

The present invention provides a method and apparatus employing a vocoder for speech processing that is well suited for applications in which the vocoder is frequently enabled and disabled during a communication session. It is recognized that the vocoder may be unable to extract accurate speech modeling parameters during a small elapsed time before the vocoder circuitry reaches steady state. Accordingly, an initial batch of audio data destined for voice encoding is preprocessed to develop parameters affecting voice encoding, such as needed for direct current bias compensation purposes. The vocoder circuitry is then programmed with the developed parameters and/or other compensation data, which results in better performance when processing the first frame and subsequent frames of audio data.

FIG. 1 is a block diagram of a radio communication device, in accordance with the present invention. In the preferred embodiment, the communication device 100 is a portable radio telephone capable of encoding and transmitting voice signals. However, the principles of the present invention have wider application, including applicability to other equipment that use a voice encoder for speech processing.

The radio telephone 100 is operable to transmit and receive audio signals, such as voice communications, and includes a transmitter 120 and a receiver 130 that operate under the control of a controller 110. The transmitter 120 and receiver 130 are selectively coupled to an antenna 150 via an antenna switch 140. An audio output device, such as a speaker 170, provides audio signals based on input from the receiver 130. An audio input device, such as a microphone 160, provides audio signals to the transmitter 120, which audio signals represent voice input or speech data. The radio telephone 100 further includes a push-to-talk switch 165, coupled to the controller 110, that is operable to enable the microphone 160 and circuitry within the transmitter 120, to communicate voice input received via the microphone 160.

The transmitter 120 is operable to transmit encoded digitized speech. Accordingly, the transmitter 120 includes a speech digitizer 122, a vocoder 125, a channel encoder 126, and an amplifier 127. The speech digitizer 122 is coupled to the microphone 160 and converts analog voice input to digital speech data. Preferably, the speech digitizer outputs batches of audio data of digitized speech obtained by sampling the microphone input signal. For example, in the preferred embodiment, the audio data is segmented into batches or frames containing data values for one hundred and sixty (160) samples of speech data at an eight (8) kilohertz sample rate. The vocoder 125 is coupled to the microphone and has an output of an encoded signal representing the speech data. The speech data encoded by the vocoder 125 is further processed by the channel encoder 126 and the amplifier 127 for transmission. As a significant aspect of the present invention, the radio telephone further includes an audio preprocessor 123 that operates to extract vocoder initialization parameters from the first frame of audio data generated by the speech digitizer after the push-to-talk switch 165 is engaged and the preprocessor switch is enabled 124, and to initialize the vocoder 125 with such parameters. Thus, the audio preprocessor is coupled to the microphone through the speech digitizer, and is responsive to the audio signal processed by the speech digitizer to provide the vocoder with initialization parameters based on characteristics of the first frame of speech data. After the first frame of data is processed for vocoder initialization parameters, the preprocessor switch 124, is disabled. The preprocessor switch 124 will be enabled again on the next transmission when the push-to-talk switch 165 is engaged.

Figure 2:
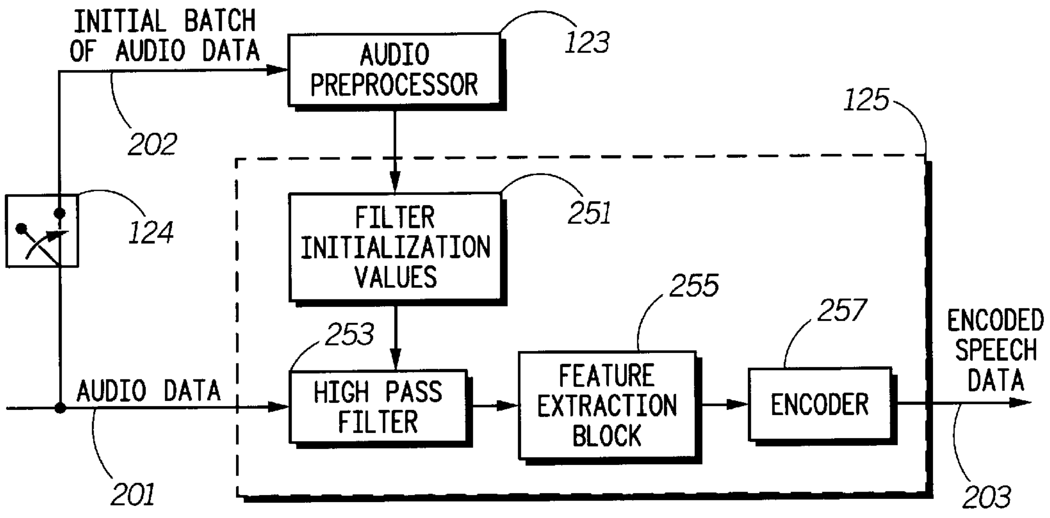
FIG. 2 is a block diagram highlighting significant elements of the vocoder of FIG. 1, in accordance with the present invention.

FIG. 2 is a block diagram highlighting significant functional blocks of the vocoder 125, audio preprocessor 123 and preprocessor selector 124, in accordance with the preferred embodiment. The vocoder 125 is preferably a multiband excitation type encoder that includes a high pass filter 253, memory for filter initialization or compensation values 251, a feature extraction block 255, and an encoder 257. The high pass filter 253 operates to remove the low frequency noise effects of direct current bias in the input signal. The feature extraction block 255 operates on a frame of speech data to extract various speech modeling parameters that are used to regenerate voice signals. In the preferred embodiment, the feature extraction block calculates an initial pitch estimate from the frame of speech data, which may be revised based on estimates calculated for other frames of data. Spectral amplitudes are also determined and used to classify sections of the frame as being either voiced or unvoiced. The encoder 257 generates the encoded data 203 using the voice feature information extracted.

Figure 3:
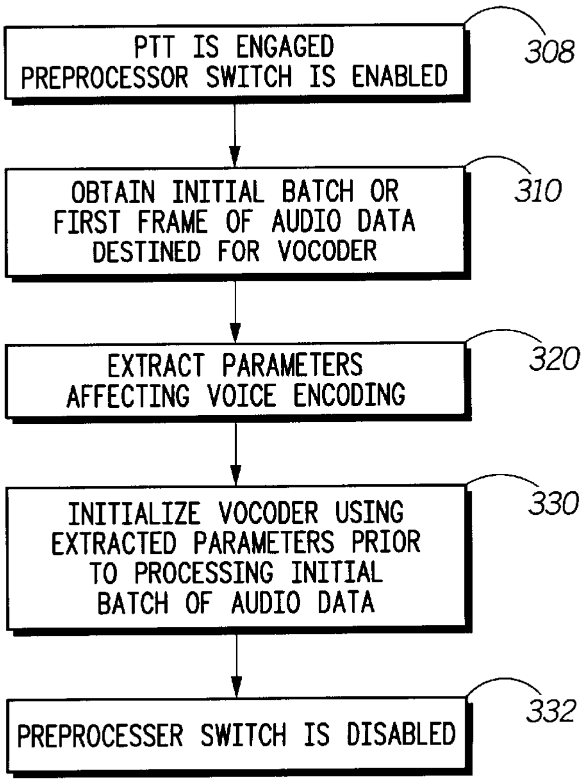
FIG. 3 is flowchart of procedures used by the vocoder for speech processing, in accordance with the present invention.

FIG. 3 is a flowchart of procedures used by the radio telephone 100 to process speech signals, in accordance with the present invention. With reference to FIG. 2 and FIG. 3, the operation of the radio telephone 100 will now be described. The vocoder 125 operates on audio data 201 to provide encoded data 203. Upon engaging the push-to-talk switch 165, the preprocessor switch 124 is enabled, step 308. The audio preprocessor then obtains the first frame of audio data 202 destined for processing by the vocoder 125, step 310. Audio data is obtained for transmission from a microphone or other audio input device enabled by the radio telephone when the push-to-talk switch 165 is engaged. The audio preprocessor then extracts parameters affecting voice encoding from the first frame of audio data, step 320. In the preferred embodiment, the extracted parameters comprise estimates of direct current bias influence on the audio data. Samples of the first frame of audio data to be presented to the vocoder are processed by the audio preprocessor to generate an average sample value. An estimate of direct current bias influence is generated from the average sample value and at least one value derived from the samples.

The vocoder is then initialized, prior to processing the first frame of audio data, with compensation data based on extracted parameters that characterize noise or other anomalies in the input audio signal, step 330. The preprocessor selector is then, disabled, step 332. In the preferred embodiment, the high pass filter depends in part on its previous input and output values, also called filter initialization values or filter initial conditions. The estimate of direct current bias influence on the audio signal is used to determine filter initialization values 251. The high pass filter is initialized using the average sample value and at least one sample value from the first frame of audio data. The previous input sample value parameter used by the filter is set to the first sample value from the first frame of audio data. Correspondingly, the previous output sample value parameter is set according to a calculation based on the average sample value from the first frame of audio data and the first sample value from the frame.

In one embodiment, the vocoder 125 is an improved multiband excitation (IMBE) encoder that employs the high pass filter to remove direct current bias from the speech data. In short, the filter is initialized with parameters based on characteristics of samples of a particular batch of speech data, and the particular batch of speech data is processed through the vocoder after the vocoder is initialized.

The present invention provides significant advantages over the prior art. In applications in which a vocoder is repeatedly enabled and disabled during a communication session, such as push-to-talk communications, prior art vocoders may be unable to correctly extract model parameters during an initial period or settling time, i.e., before the vocoder circuitry is at steady state. With application of the present invention, the vocoder is properly initialized prior to processing the initial batch of audio data, which avoids the transmission of noisy signals at the start of a particular communication.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for initializing a vocoder for speech processing, comprising the steps of:

enabling an audio preprocessor when the push-to-talk switch is engaged;

obtaining the first frame of audio data destined for processing by the vocoder;

processing a plurality of samples of the audio data to generate an average sample value;

generating an estimate of direct current bias influence from the average sample value and at least one value derived from the plurality of samples;

using compensation data based on the extracted parameters to initialize a previous output value and a previous input value for a filter associated with the vocoder; thereby initializing the filter to process the batch of audio data; and processing the batch of audio data through the vocoder, after the step of initializing.

2. The method of claim 1, wherein the step of initializing comprises the step of initializing the filter initial conditions using the average sample value and the at least one value from the first frame.

3. The method of claim 1, wherein the step of initializing comprises the steps of:

setting a previous input sample parameter used by the filter to the at least one value; and setting a previous output sample parameter used by the filter according to a calculation based on the average sample value and the at least one value.

4. A method of processing a batch of speech data through a voice encoder, the voice encoder employing a filter to remove direct current bias from the batch of speech data, the method comprising the steps of:

initializing the filter with parameters representing a previous filter output value and a previous filter input value based on characteristics of samples taken from the first frame of speech data, prior to processing the first frame of speech data through the filter;

processing the speech data for generating an average sample value;

generating an estimate of direct current bias influence from the average sample value and at least one value derived from the speech data.

5. The method of claim 4, wherein the voice encoder is a multiband excitation type encoder, and the filter is a high pass filter.

6. In a radio communication device, a method comprising the steps of:

enabling an audio input device;

enabling an audio preprocessor selector;

obtaining a batch of audio data from the audio input device for transmission;

preprocessing the batch of audio data to extract parameters for a voice encoder;

applying the parameters to set a previous filter input and output value for the voice encoder, thereby initializing the filter to process the batch of audio data;

processing the batch of audio data to generate an average sample value:

generating an estimate of direct current bias influence from the average sample value and at least one value derived from the batch of audio data;

transmitting the voice encoded data; and disabling the audio preprocessor selector.

7. The method of claim 6, wherein the step of applying the parameters comprises the step of initializing a high pass filter with the compensating values for direct current bias.

8. The method of claim 7, further comprising the step of processing audio data, obtained subsequent to the step of applying the parameters, through the voice encoder without further initialization of the high pass filter until the audio input device is subsequently disabled.

9. A radio communication device, comprising:

an audio input device that provides an audio signal representing speech data;

a vocoder coupled to the audio input device and that processes the audio signal to provide an output of an encoded signal representing the speech data, the vocoder having a filter;

an audio preprocessor coupled to the audio input device, and responsive to the audio signal to set previous output and previous input values for the filter using initialization parameters based on characteristics of the speech data, wherein such initial output and input values is set prior to the processing of the audio signal by the vocoder; and wherein the speech data is used to generate an average sample value and further wherein an estimate of a direct current bias influence is generated from the average sample value and at least one value derived from the speech data.

10. The radio communication device of claim 9, wherein the vocoder comprises a filter to compensate for direct current bias, and the initialization parameters comprise compensating values for the filter.

11. The radio communication device of claim 10, wherein the vocoder is a multiband excitation type encoder.

* * * * *